US009396364B2

(12) United States Patent
Hoeksel et al.

(10) Patent No.: US 9,396,364 B2
(45) Date of Patent: Jul. 19, 2016

(54) DEVICE AND METHOD FOR SHORT RANGE COMMUNICATION

(75) Inventors: Sebastiaan Hoeksel, Maastricht (NL); Najib Koraichi, Schimmert (NL); Patrick H. Waters, Redlynch Salisbury (GB)

(73) Assignee: Vodafone Holding GmbH, Dusseldorf (DE)

( * ) Notice: Subject to any disclaimer, the term of this patent is extended or adjusted under 35 U.S.C. 154(b) by 632 days.

(21) Appl. No.: 12/635,146

(22) Filed: Dec. 10, 2009

(65) Prior Publication Data

US 2010/0151790 A1    Jun. 17, 2010

(30) Foreign Application Priority Data

Dec. 12, 2008   (EP) .................................. 08021612

(51) Int. Cl.
*H04B 7/00* (2006.01)
*G06K 7/00* (2006.01)
*G06K 7/10* (2006.01)
*H04L 29/06* (2006.01)

(52) U.S. Cl.
CPC .......... *G06K 7/0008* (2013.01); *G06K 7/10237* (2013.01); *H04B 7/00* (2013.01); *H04L 63/0853* (2013.01)

(58) Field of Classification Search
CPC ............ H04B 7/00; H04B 1/38; G06F 13/00; H04W 88/02
USPC ................... 455/41.1, 41.2, 67.11, 41.3, 558; 710/110; 726/2
See application file for complete search history.

(56) References Cited

U.S. PATENT DOCUMENTS

| 6,871,063 | B1 * | 3/2005 | Schiffer | ................ | G06F 21/35 455/269 |
| 7,194,438 | B2 * | 3/2007 | Sovio | .................... | G06Q 20/20 705/50 |
| 7,599,703 | B2 * | 10/2009 | Derks | ................ | H04B 1/7156 375/132 |
| 7,866,564 | B2 * | 1/2011 | Ho | .............................. | 235/492 |
| 8,429,713 | B2 * | 4/2013 | Candelore | ........ | H04N 21/43615 348/558 |
| 2005/0187882 | A1 * | 8/2005 | Sovio | .................... | G06Q 20/20 705/64 |
| 2006/0165060 | A1 * | 7/2006 | Dua | ...................... | G06Q 20/20 370/352 |
| 2007/0121541 | A1 * | 5/2007 | Matsuo | ............... | H04L 12/2856 370/328 |
| 2007/0145135 | A1 * | 6/2007 | Jogand-Coulomb et al. | . | 235/451 |

(Continued)

FOREIGN PATENT DOCUMENTS

WO    WO 2008107437    *    9/2008

*Primary Examiner* — Wesley Kim
*Assistant Examiner* — M D Talukder
(74) *Attorney, Agent, or Firm* — International IP Law Group, PLLC

(57) ABSTRACT

There is provided a communication device and method for contactless short range communication between a device and a terminal. An exemplary communication device comprises a communication component for contactless short range communication with a terminal. The exemplary device also comprises a slave element adapted to execute at least one application for executing transactions between the communication component and the terminal, wherein the slave element is coupled to the communication component via a first interface and wherein the slave element can be coupled to a secure master element via a second interface, the master element being adapted to control the slave element before a transaction is executed using the application.

17 Claims, 1 Drawing Sheet

(56) References Cited

U.S. PATENT DOCUMENTS

| | | | |
|---|---|---|---|
| 2007/0155430 A1* | 7/2007 | Cheon | H04M 1/72527 455/558 |
| 2007/0257796 A1* | 11/2007 | Easton | G08B 21/0275 340/572.1 |
| 2007/0293155 A1* | 12/2007 | Liao | G06Q 20/32 455/41.2 |
| 2008/0029609 A1* | 2/2008 | Ho | G06K 19/073 235/492 |
| 2008/0057990 A1* | 3/2008 | Fuccello | H04W 76/02 455/507 |
| 2008/0162361 A1* | 7/2008 | Sklovsky | G06Q 20/32 705/65 |
| 2008/0214242 A1* | 9/2008 | Koraichi | H04M 1/72519 455/558 |
| 2009/0047991 A1* | 2/2009 | Elg | H04W 52/0293 455/552.1 |
| 2009/0070272 A1* | 3/2009 | Jain | G06K 19/07739 705/75 |
| 2009/0070861 A1* | 3/2009 | Jain | 726/5 |
| 2009/0075592 A1* | 3/2009 | Nystrom | G06K 19/0719 455/41.1 |
| 2009/0098825 A1* | 4/2009 | Huomo | G06Q 20/20 455/41.1 |
| 2009/0108063 A1* | 4/2009 | Jain | G06K 7/10237 235/380 |
| 2009/0157928 A1* | 6/2009 | Riegebauer | 710/110 |
| 2009/0221303 A1* | 9/2009 | Soliman | 455/458 |
| 2010/0044444 A1* | 2/2010 | Jain | G06K 7/10237 235/492 |
| 2010/0084465 A1* | 4/2010 | Jolivet | G06K 7/0008 235/439 |
| 2010/0151790 A1* | 6/2010 | Hoeksel et al. | 455/41.2 |
| 2012/0088484 A1* | 4/2012 | Koraichi | H04B 1/3816 455/418 |
| 2012/0094603 A1* | 4/2012 | Hoeksel | G06Q 20/3226 455/41.2 |

* cited by examiner

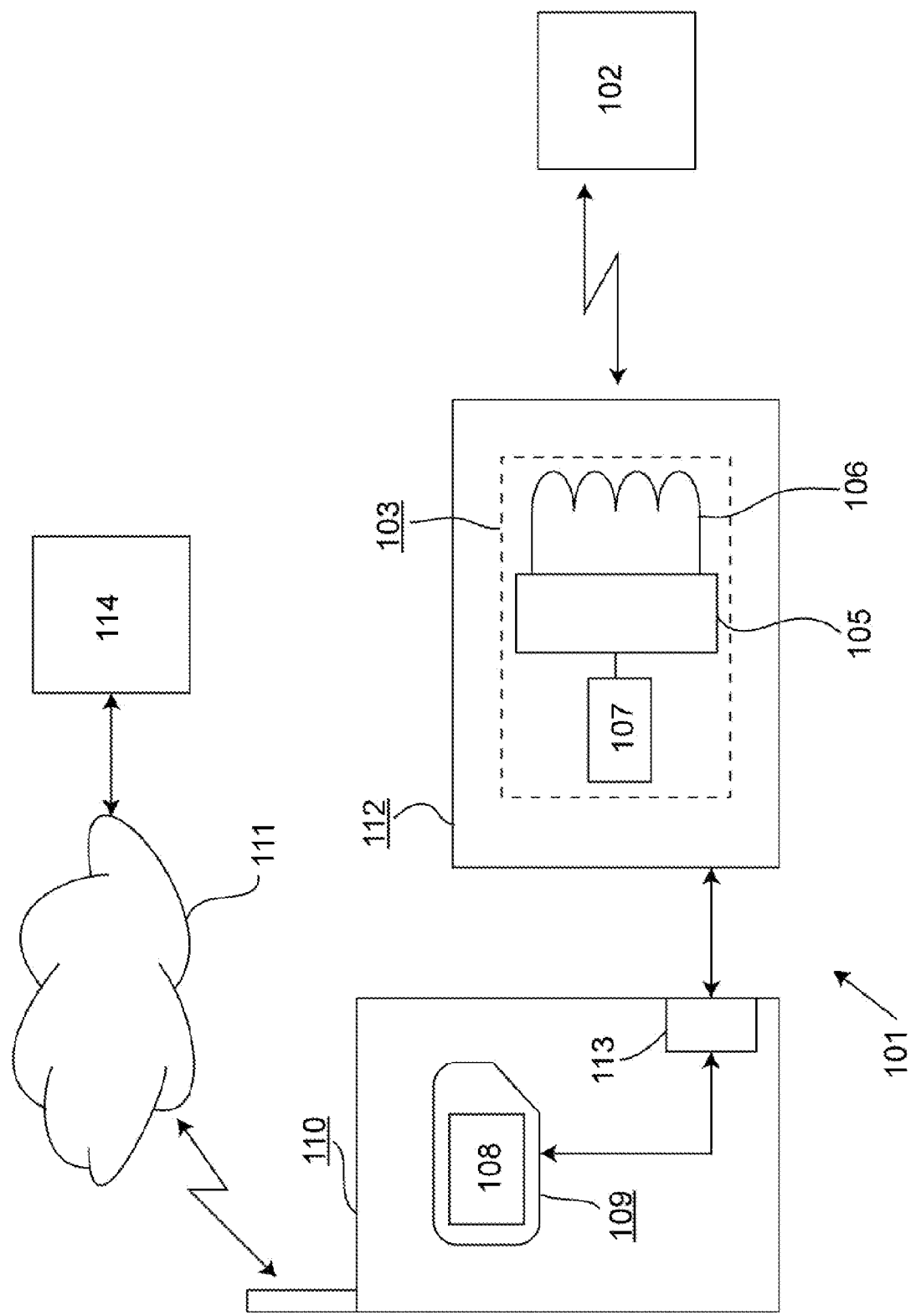

DEVICE AND METHOD FOR SHORT RANGE COMMUNICATION

CROSS REFERENCE TO RELATED APPLICATION

This application claims priority to European (EP) Patent Application No. 08 021 612.0, filed on Dec. 12, 2008, the contents of which are incorporated by reference as if set forth in their entirety herein.

BACKGROUND

Portable devices, such as, for example, integrated circuit cards, or mobile communication devices, such as cellular phones, Personal Data Assistants (PDAs), can dispose of a communication interface for wireless short range communication with a terminal. Such an interface can be used for executing transactions between the mobile device and the terminal. The transactions may be financial transactions allowing making an electronic payment using the mobile device. Another example is an electronic ticketing transaction, in which an electronic ticket is provided by the mobile device and validated by the terminal.

One example of an interface for short range communication is a Near Field Communication (NFC) interface, which allows a communication with an NFC enabled terminal. The NFC technology is specified in ISO 18092 and 21481, ECMA 340.352 and 356, and ETSI TS 102 109 and allows contactless communication between devices over a short distance of about 10 to 30 centimeters. Near field devices comprise an NFC controller with a micro processor and memory and a magnetic loop antenna operating at a frequency of 13.56 MHz. The NFC controller controls the antenna on a physical level. On an application level, the execution of transactions is controlled by NFC applications, which are executed in a secure element connected to the NFC controller. Since the execution of transactions, such as financial transactions or ticketing transactions, usually involves sensitive data, the secure element provides a security architecture preventing unauthorized third parties from accessing the sensitive data.

Transactions are usually executed by passing the NFC capable device over an NFC enabled terminal. This means that usually only a very short time is available for the execution of a transaction. For this reason, the master element should be connected to the NFC controller in such a way that a sufficiently fast communication between the master element and the NFC controller is possible. In order to achieve this, special interfaces between the NFC controller and the master element have been developed. One such interface is the Single Wire Protocol (SWP) interface specified by the ETSI.

It has already been proposed to integrate the secure element into smartcard included in a mobile device, particularly into a Subscriber Identity Module (SIM) card that is typically included in a mobile communication device. The SIM card, which may be a SIM card according to the Global System for Mobile Communications (GSM) specification or a Universal Integrated Circuit Card (UICC) comprising a Universal Subscriber Identity Module (USIM) application according to the Universal Mobile Telecommunications System (UMTS) specification, for example, provides secure identification and/or authentication services towards a mobile communication network, in which the mobile communication device is used. By integrating the master element into a SIM, card the already existing security architecture of the SIM card can be used.

However, to date, the integration of the master element into the SIM card or another smartcard requires that the SIM card or smartcard provides an interface for connecting the card to the NFC controller, which allows for a sufficiently fast communication between the secure element and the NFC controller. An integration of the secure element into a smartcard or SIM card, which does not dispose of such an interface, is not possible or bears the risk that a transaction cannot be completed in the time available.

Furthermore, NFC devices can be operated in a passive communication mode, in which they do not generate an own radio frequency field for communicating with a terminal. In the passive communication mode, the NFC controller can be powered by the radio frequency field generated by the terminal, so that the NFC device does not need to power the NFC controller with its own power source. Dedicated interfaces for connecting the master element to the NFC controller, such as the SWP, also allow for powering the unit including the secure element with the radio frequency field generated by the terminal. This is, however, not possible, when the master element is integrated into a smartcard or SIM card, which does not dispose of an interface supporting such a power supply of the smartcard or SIM card.

SUMMARY OF THE INVENTION

Exemplary embodiments of the present invention relate to the field of short range communication. More specifically, exemplary embodiments may relate to a device comprising a communication component for contactless short range communication with a terminal. Furthermore, exemplary embodiments of the invention may be related to a method for short range communication between a device and a terminal.

An exemplary embodiment of the present invention allows the integration of a secure element storing data used in a transaction executed via short range communication into an arbitrary unit, particularly into an arbitrary smartcard, and, at the same time, provides a security level, which is as high as possible.

Exemplary embodiments of the present invention relate to a device comprising a communication component for contactless short range communication with a terminal and a slave element being adapted to execute at least one application for executing transactions between the communication component and the terminal. The slave element is coupled to the communication component via a first interface and the slave element can be coupled to a secure master element via a second interface, the master element being adapted to control the slave element before a transaction is executed using the application.

An exemplary embodiment may provide a method for contactless short range communication between a device and a terminal. The exemplary method comprises coupling a slave element to a communication component for contactless short range communication via a first interface, the slave element being adapted to execute at least one application for executing transactions between the communication component and the terminal. Furthermore, the exemplary method comprises coupling the slave element to a master element via a second interface, the master element being adapted to control the slave element before a transaction is executed using the application.

According to an exemplary embodiment of the present invention, an application for executing a transaction between a communication component and a terminal is provided in a slave element. The slave element can be coupled to the communication component in such a way that the communication between the communication component and the slave element is sufficiently fast. Moreover, the interface between the communication component and the slave element may allow for powering the slave element or the unit providing the slave element using an external radio frequency field generated by the terminal.

In one exemplary embodiment, the slave element may be integrated into the communication component and may communicate with the communication component via an internal interface. Furthermore, the communication component may comprise an antenna and a controller coupled to the antenna. In this configuration, the slave element may be integrated into the controller. Another example of a first interface, which can be used, is an SWP interface.

Moreover, a secure master element may be provided, which controls the slave element. The master element can ensure the security of sensitive data. An interaction between the master element and the slave element precedes the execution of the transaction, so that no special interface between the master element and the slave element has to be provided. In particular, the interface does not have to allow an especially fast communication. Therefore, in devices and methods according to an exemplary embodiment of the present invention, the first interface allows a faster data exchange than the second interface. The faster data exchange of the first interface may be because of a faster set up of a communication via the first interface and/or due to a faster data transfer rate via the first interface.

The secure master element may provide a higher level of security than the slave element. The higher level of security of the master element may be achieved by a more tamper resistant security architecture of the master element. Furthermore, the lower security level of the slave element may result from other circumstances. For example, the slave element may be integrated into a separate unit of the device providing a lower security level than the unit including the master element.

An exemplary embodiment of the present invention also allows using one slave element together with more than one master element. Particularly, the slave element may be coupled to an associated communication component and the slave element may be connectable to different master elements via a second interface, each master element being adapted to control the slave element before a transaction is executed.

In one exemplary embodiment, the slave element is configured in such a way that the application is not able to execute a transaction without an interaction between the master element and the slave element preceding the transaction. This ensures that the slave element does not execute transactions independently from the master element and thereby increases the security.

In a further exemplary embodiment, the master element is adapted to provide the application to the slave element in response to a first event and/or to provide information to slave element in response the first event, the information being necessary for executing the transaction. This ensures that a transaction cannot be executed without a preceding interaction between the master element and the slave element, since the application and/or the information necessary for executing the transaction is not available in the slave element until it is provided by the master element.

The application or the information may be provided by the master element, when the master element and the slave element are connected to each other for the first time or when the application or the information is received in the master element. In order to increase security, the application and/or the information may also be provided each time the master element and the slave element are connected to each other and the slave element may be adapted to delete the application and/or the information, when it is being disconnected from the master element.

Furthermore, a device and method according to an exemplary embodiment of the present invention may provide that the master element is adapted to unblock the slave element for the execution of a transaction in response to a second event. This also ensures that a transaction cannot be executed without a preceding interaction between the master element and the slave element. In order to further increase the security, it may be provided that the master element unblocks the slave element each time the elements are being connected to each other provided that the second event occurred.

In an exemplary device and method, the master element may be adapted to verify an authentication feature allocated to the slave element, the authentication feature being transmitted from the slave element to the master element. A successful verification of the authentication feature may correspond to the first and/or the second event. In such an exemplary embodiment, the master element may interact with a trusted slave element. This is especially advantageous in case the slave element is removably connected to the slave element. The authentication feature may be a digital signature or a credential that is shared between the master and the slave element.

In another exemplary embodiment of the device and the method, the master element may be adapted to restrict an ability of the application to execute a transaction. Advantageously, the restriction is chosen in such a way that a tampering of the slave element causes only minor damage to the user of the device and the provider of the service. In particular, this allows providing a lower level of the security for the slave element than for the master element.

In one exemplary embodiment of the device and the method, the master element may be adapted to provide at least one token to the application, the token being validated in the terminal before the transaction is executed. In this exemplary embodiment, the restriction of the ability of the slave element to execute transactions may be achieved by providing only a limited number of tokens to the slave element. The validity of the tokens is verified by the terminal so that the slave element does not need to provide a security mechanism in order to observe the restrictions.

A related exemplary embodiment of the device and the method may provide that a validity of the token for the execution of transactions is limited. Here, various limitations can be provided. In particular, one token may only be valid within a predetermined period of time or it may only be valid for the execution of a predetermined number of transactions. Likewise, one token may only allow transactions until a predetermined amount of certain quantity is reached, which may be an amount of money spent in payment transactions or any other quantity relating to the provided transactions. Moreover, one token may only be valid for the execution of transactions with predetermined terminals, which may be terminals in a predetermined geographical region, terminals operated by predetermined operators or terminals that are identified according to any other suitable criterion.

In a further exemplary embodiment of the device and the method, the master element may be adapted to transmit at least one constraint to the slave element. The constraint may restrict the ability of the application to execute transactions and being observed by the slave element and/or the application. The constraint can be defined autonomously in the device without having to involve the terminals for observing the constraint.

The constraint may correspond to one the aforementioned limitations of the tokens. Thus, one constraint may allow the application of the slave element to execute only a predetermined number of transactions or to execute transactions only within a predetermined period of time. Likewise, a constraint may allow transactions until a predetermined amount of a quantity is reached. Moreover, a constraint may allow the execution of transactions only with predetermined terminals, which may be terminals in a predetermined geographical region, terminals operated by predetermined operators or terminals that are identified according to any other suitable criterion.

In one exemplary embodiment of the device and the method, the device comprises a first device including the master element and a second device including the communication component and the slave element. The second device may be removably attachable to the first device. In this configuration, no special interface between the first device and the second is required. Rather, the master element and the slave element may be connected to each other via a second interface, which may be an already existing interface supported by the first and the second device. In particular, the interface may a Bluetooth interface or a Universal Serial Bus (USB) interface.

The first device may be a mobile communication device. Furthermore, the master element may be included in a smartcard, particularly in a SIM card, connected to the first device.

As used herein, the term "SIM card" refers to a smartcard offering identification and/or authentication services to a mobile communication network. The smartcard may comprise a SIM application according to the GSM specification, a USIM application according to the UMTS specification or corresponding applications providing authentication and/or identification functions in connection with a mobile communication network.

In one exemplary embodiment, the communication component is configured according to an NFC specification and comprises an antenna and an NFC controller. The slave element may be integrated into the NFC controller, as already described before.

BRIEF DESCRIPTION OF THE DRAWING

Certain exemplary embodiments are described in the following detailed description and in reference to the drawings, in which:

FIG. 1 is a block diagram of a system comprising a communication unit for short range communication, the communication unit including a mobile communication device and an add-on device, according to an exemplary embodiment of the present invention.

DETAILED DESCRIPTION OF SPECIFIC EMBODIMENTS

FIG. 1 schematically depicts a communication unit 101, which is capable of communicating wirelessly with a terminal 102. The communication unit 101 comprises a communication component 103, which includes a controller 105 and an antenna 106. The antenna 106 is configured to receive radio signals from the terminal 102 and/or to transmit radio signals that can be received in the terminal 102. The terminal 102 disposes of corresponding transmitting and/or receiving modules so that the terminal 102 can transmit radio signals to the communication unit 101 and/or receive radio signals sent from the communication unit 101.

The controller 105 controls the antenna 106 on the physical layer. This means that the controller 105 sets up the operation mode of the communication component 103 and controls the exchange of the radio signal between the antenna 106 and the terminal 102. Moreover, the controller 105 communicates with an application that controls the data exchange between the communication unit 101 and the terminal 102 on the application level. Here, the controller 105 forwards a data messages received via the antenna 106 to the application concerned and controls the antenna 106 to transmit data messages received from this application to the terminal 102. The functionalities of the controller 105 are provided by a microcontroller comprising a microprocessor for executing programs and a memory for storing programs and data used by the programs.

The communication between the communication unit 101 and the terminal 102 preferably uses a short range communication technology, which allows for exchanging data between the communication unit 101 and the terminal 102 over a short range between several centimeters and several ten centimeters. In one embodiment, the communication is based on at least one of the specifications ISO 14443 Type A, ISO 14443 Type B, ISO 18092 and ISO 15693. In particular, the Near Field Communication (NFC) technology may be used, which implements the aforementioned specifications.

In an exemplary embodiment, the antenna 106 is configured as a magnetic loop antenna operating at a carrier frequency of 13.56 MHz and a radio signal can be exchanged over a distance of about 10-30 centimeters. Moreover, the communication component 103 can be operated in several different modes, which correspond to the different tag types defined in the NFC specifications and which differ in the communication protocols used and in the data transmission rates, for example. Type 1 and type 2 tags are based on the specification ISO 14443 type A, type 3 tags use the specification ISO 18092 and type 4 tags are compatible to the specifications ISO 14443 type A and type B.

Furthermore, an NFC enabled communication component 103 can be operated in an active and in a passive communication mode. In the active communication mode the communication component 103 and the terminal 102 each generate a high frequency field at the carrier frequency in order to send data to the communication partner. In the passive communication mode only one communication partner, which is called initiator, generates a high frequency field at the carrier frequency that is used by the initiator to transmit data to the other communication partner which is called target. The target uses load modulation for transmitting data to the initiator. This means that the current through the antenna 106 of the target is modulated using a controllable resistor. In the passive communication mode, the communication component 103 may be the initiator of the communication as well as the target. In case the communication component 103 acts as the target, the communication component 103, and in particular the controller 105, may be powered by the high frequency field generated by the initiator. For being operable in further operation modes, the communication component 103 disposes of a power supply.

The communication unit 101 can interact with the terminal 102 in order to execute transactions with the terminal 102. The transactions may be payment transactions or ticketing transactions, for example. From the perspective of the user of the communication unit 101, the transaction is simply executed by bringing the communication device 110 in proximity to the terminal 102 for a relatively short time. Thus, payment can be made or an electronic ticket can be presented for validation by passing the communication unit 101 over the terminal 102. In the communication unit 101, the transaction is controlled by one or more applications, which control the execution of the transactions and which provides the data necessary for executing the transactions. For each type of transaction, one corresponding application may be provided. Furthermore, the application may be configured to interact with certain terminals 102, such as, for example terminals 102 operated by a certain service provider.

During the execution of a transaction between the communication unit 101 and the terminal 102, the data exchange between the communication unit 101 and the terminal 102 is controlled by an application, which is provided by a slave element 107 included in the communication unit 101. The slave element 107 provides an environment for executing applications on a microprocessor of the communication component 103 and for storing data in the communication component 103. In one embodiment, the microprocessor corresponds to the controller 105 of the communication component 103, as depicted in FIG. 1. However, the communication component 103 may likewise comprise a further microprocessor for providing the slave element 107. The slave element 107 may be connected to the controller 105, via an internal interface of the controller 105. Likewise, particularly in case the slave element is provided by a further microprocessor of the communication component 103, a SWP or a similar interface may be used. The interface between the controller 105 and the slave element may allow that the slave element is powered with a radio frequency field generated by the terminal 102, when the communication component 103 acts as target in the passive communication mode as described before.

The slave element 107 interacts with a secure master element 108. The secure master element 108 provides an environment for executing applications and storing data and is embedded into a security architecture which prevents the master element 108 from being tempered with. In particular, the security architecture prevents that applications executed in the master element 108 can be manipulated and the data can be read from the master element 108 by unauthorized third parties. In contrast thereto, the slave element 107 does not have to be particularly protected against unauthorized access by third parties in certain exemplary embodiments of the invention. However, in some exemplary embodiments, at least certain functionalities of the slave element 107 are protected against tampering by a secured hardware and/or software. Here, the security level provided by the slave element 107 may be lower than the level of security, which the master element 108 provides.

In the exemplary embodiment shown in FIG. 1, the master element 108 is integrated into a smartcard 109. As common for smartcards in general, the smartcard 109 comprises a microcontroller including a microprocessor for running programs and a memory for storing data. The microcontroller provides a secure environment for the execution of applications and the storage of data and the master element 108 is part of this secure environment. In particular, unauthorized access to data and processes is prevented due to the hardware design of the microcontroller and due to cryptographic mechanisms used for managing data in the microcontroller. Moreover, the microcontroller is integrated into a secure hardware environment provided by the smartcard 109, which is physically protected against manipulations, such as power analysis, reverse engineering or the like.

As shown in FIG. 1, the smartcard 109 is inserted into a mobile communication device 110, which may be configured as a cellular phone, a PDA (Personal Data Assistant) or the like. The mobile communication device 110 can be connected wirelessly by a radio module (not shown in FIG. 1) to a mobile communication network 111 via a radio access network. For instance, the mobile communication network 111 may be a Global System for Mobile Telecommunications (GSM) network or a Universal Mobile Telecommunications System (UMTS) network. Preferably, the smartcard 109 is used in conjunction with a utilization of a mobile communication device 110 in the mobile communication network 111. In particular, the smartcard 109 may comprise an application, which provides secure identification and authentication services to the mobile communication network 111. Thus, an already existing smartcard 109 can be used for providing the master element 108.

If the mobile communication network 111 is a GSM network, the smartcard 109 is configured as a SIM card according to the GSM standard comprising a SIM application, which provides the identification and authentication services. If the mobile communication network 111 is a UMTS network, the smartcard 109 is configured as a Universal Integrated Circuit Card (UICC) comprising a USIM application providing the identification and authentication services. In the following, the smartcard 109 is referred to as SIM card. However, the term SIM card, as used herein, is to be understood as including also smartcards 109 comprising SIM or USIM applications or corresponding applications providing authentication and/or identification functions in connection with a mobile communication network 111.

In one exemplary embodiment, the communication component 103 is integrated into the mobile communication device 110. Here, a data exchange between the master element 108 and the slave element 107 uses internal interfaces of the mobile communication device 110 and may be controlled by the main processor of the mobile communication device 110. In another exemplary embodiment, which is schematically depicted in FIG. 1, the communication component 103 is provided by a further device 112, which is referred to as add-on device 112 hereinafter. The add-on device 112 is connected to the mobile communication device 110 via an external interface 113 of the mobile communication device 110. It may be adapted to be disconnected from the mobile communication device 110 so that the connection between the mobile communication device 110 and the add-on device 112 only exists temporarily. The interface 113 used may allow for wirelessly connecting the add-on device 112 to the mobile communication device 110. In this exemplary embodiment, the external interface 113 may be a radio interface, particularly a Bluetooth interface, or an optical interface, such as, for example, an infrared interface. Likewise, the external interface 113 may provide for a wired connection between the add-on device 112 and the mobile communication device 110. In this embodiment, the interface 113 may be a Universal Serial Bus (USB) interface, for example.

Thus, the add-on device 112 allows to provide contactless communication capability, particularly NFC capability, to mobile communication device 110, which itself are not NFC enabled. Here, one add-on device 112 can also be used together with different mobile communication devices 101. For instance, this allows a user disposing of several mobile communication devices 101 to use his communication devices 101 together with one add-on device 112, which is being connected to one of the mobile communication devices 101, if required. In one exemplary embodiment, the add-on device is capable of connecting to different external interfaces 113 of mobile communication devices 110. This allows choosing the interface 113 for connecting the add-on device 112 to the mobile communication device 110 according to the capabilities of the mobile communication device 110, particularly according to the existing external interfaces 113. If a mobile communication device 110 disposes of more than one external interface 113 supported by the add-on device, the user may choose the interface 113 used.

In one exemplary embodiment, the SIM card 109 can access the external interface 113 of the mobile communication device 110 directly. For instance, the SIM card 109 may provide USB functionality used for accessing the external interface 113, if the external interface 113 is a USB interface. In further embodiments, the SIM card 109 does not access the external interface 113 directly, but via an application provided by the mobile communication device 110. The application may be executed in the main processor of the mobile communication device 110, for example. For instance, the application may be a Java application executed in a Java environment provided by the main processor of the mobile communication device 110. Particularly, Java Platform, Micro Edition (Java ME) may be used as the Java environment in the mobile communication device 110. Towards the SIM card 109, the application may use the Security and Trust Services API (SATSA) specified in JSR 177, for example. If the external interface 113 of the mobile communication device 110 is configured as a Bluetooth interface, the Java APIs for Bluetooth Wireless Technology specified in JSR 82 may be used for accessing the interface 113 of the mobile communication device 110.

The data connection between the master element 108 and the slave element 107 does not have to be an especially fast data connection. It is neither necessary to set up the connection especially fast or to transfer data over the data connection especially fast. For this reason, it is possible, for example, to use a Bluetooth interface of the mobile communication device 110 for connecting the add-on device 112 to the mobile communication device 110. Usually, a Bluetooth connection is not suitable for a fast data exchange between two devices, since it already takes a relatively long time to set up the connection.

In contrast thereto, the slave element 107 is coupled to the controller 105 in such a way, that a fast data exchange is ensured. In particular, the link between the slave element 107 and the controller 105 allows for exchanging data relative to a transaction controlled by a slave application within the short time period available, while the user passes the communication unit 101 over the terminal 102. Therefore, the interface between the slave element 107 and the controller 105 may implement the Single Wire Protocol (SWP), which has been developed particularly in view of NFC applications, or another communication protocol allowing for a sufficiently fast data transfer.

In one exemplary embodiment, the mobile communication device 110 is connected to a server 114, which is capable to interact with the SIM card 109. As will be described in the following, the server 114 may provide data to the master element 108 included in the SIM card 109, which is used in transactions between the communication component 103 and a terminal 102. As depicted in FIG. 1, the server 114 may be connected to the mobile communication network 111 so that it communicates with the mobile communication device 110 via the mobile communication network 111. In this case, the so-called over-the-air (OTA) technology as described, for example, in ETSI TS 102 225 and in 3GPP TS 23.048, may be used for providing data to the master element 108 and/or to manage applications in the master element 108 remotely from the server 114 in a secure way. To ensure security against unauthorized accesses the server 114 encrypts the communication using a key, which is shared between the server 114 and the SIM card 109. The SIM card 109 decrypts the data using a corresponding decryption key thereby confirming that the data originates from server 114. If the data cannot be validated successfully, the SIM card 109 denies access to the master element 108.

The master element 108 includes one or more applications, which interact with the slave element 107 that controls the execution of transactions between the communication component 103 and the terminal 102. In particular, the master element 108 may provide applications that interact with allocated applications executed in the slave element 107. This means that a program, which is provided for controlling certain transaction, comprises two parts, one of which is included in the slave element 107, while the other part is included in the master element 108. The part of an application included in the master element 108, which is referred to as master application hereinafter, is capable of managing the part of the application comprised in the slave element 107, which is referred to as slave application hereinafter. In particular, the master application enables the slave application to execute transaction with a terminal 102 and/or restricts the ability of the slave application to execute transactions with a terminal 102. For this purpose, the master application may provide information to the slave application, which is necessary for the execution of a transaction, or the master application may provide restrictions to the slave application, which prevent the slave application from executing certain transaction.

Likewise, the master element 108 may comprise one or more applications that are capable of affecting the operation of the slave element 107 as a whole. This means that functionalities of several or all single application contained in the slave element 107 can be affected. For instance, the slave element 107 may block functionalities unless they are unblocked by an application included in the master element 108.

If more than one mobile communication device 110 is used in connection with the add-on device 112, each mobile communication device 110 may provide a master element 108 in the way described before. The master elements 108 of the different mobile communication devices may comprise master application relating to the same services and/or service providers, or they may comprise master applications relating to different services and/or service providers.

The relationship between the role of the master element 108 and the role of the slave element 107 reflects the different levels of trust, which the respective elements provide. The master element 108 provides a high security level, since the master element 108 is embedded into a secure SIM card 109 providing a sophisticated security architecture. In contrast thereto, the slave element 107 provides a lower security level, especially when it is contained in an add-on device 112 which can be disconnected from the mobile communication 110.

The master application may provide the information needed to execute transaction to the corresponding slave application. This information may comprise information for authenticating the user of the communication unit 101 towards a terminal 102 as wells as other necessary information. The data may be preinstalled in the master application or it may be added at later time. This may be done manually by the user or by the OTA mechanism described before. A master application may transmit the data to the corresponding slave application once, when the slave element 107 is connected to the master element 108 for the first time or when the information is made available in the master element 108. In another exemplary embodiment, the data is transmitted to the slave application each time the slave element 107 is newly connected to the master element 108, i.e. each time the add-on device 112 is connected to the mobile communication device 110 and/or each time the mobile communication device 110 or the add-on device 112 is powered up. In this embodiment, the data is deleted in the slave element 107 each time the add-on device 112 is disconnected from the mobile communication device 110 and each time the mobile communication device 110 or the add-on device 112 is powered down. For this purpose, the slave application or the slave element 107 disposes of a secured mechanism for deleting the data in the aforementioned situations. The deletion of the data ensures that the communication component 103 cannot execute transactions when it is not connected to the mobile communication device 110.

In a further exemplary embodiment, the slave applications included in the slave element 107 are being deleted by a corresponding mechanism of the slave element 107 in addition to the data in the aforementioned situations. Here, the slave application are installed by the corresponding master applications in the slave element 107 each time the add-on device 112 is connected to the mobile communication device 110 and/or each time the mobile communication device 110 or the add-on device 112 is powered up.

In one exemplary embodiment, the execution of a transaction between the communication component 103 and a terminal 102 requires that the communication component 103 provides a token to the terminal 102, which validates the token. The token has to be validated successfully in the in the terminal 102, otherwise the terminal 102 refuses the execution of the transaction. The tokens may be codes or other credentials. Each token only has a limited validity. In particular, one token may only be valid within a predetermined period of time or it may be valid for the execution of a predetermined number of transactions. Likewise, one token may only allow transactions until a predetermined amount of certain quantity is reached, which may be an amount of money spent in payment transactions or any other quantity relating to the provided transactions. Moreover, one token may only be valid for the execution of transactions with predetermined terminals 102, which may be terminals 102 in a predetermined geographical region, terminals 102 operated by predetermined operators or terminals 102 that are identified according to any other suitable criterion. One token may be subject to one limitation or it may be subject to several limitations, for example, several of the aforementioned limitations.

When the user of the communication unit 101 subscribes to a service with a provider of the service, a plurality of tokens is provided to the user by the service provider. These tokens may be stored in the master element 108 and are managed by a master application provided in connection with the service, which may be an electronic ticketing or an electronic payment service, for example. As an alternative the tokens may be transmitted from the server 114 to the master application upon request using the OTA mechanism. The request may be sent to the server 114 by the master application, if required.

Before the service is used for the first time, the master application provides a predetermined number of tokens to the corresponding slave application included in the slave element 107. The number may be preconfigured in the master application or it may be configured by the user of the communication unit 101 using a user interface provided by the master application. After the master application has provided the tokens to the slave application, the slave application stores the received tokens in the slave element 107. Then, the slave application can use the received tokens to execute transactions with terminals 102.

After all tokens stored in the slave element 107 have been used and/or after the validity of the tokens stored in the slave element 107 has expired, the slave application can no longer execute transactions without a further interaction with the master application. Therefore, the slave application notifies the master application of the expiration of the validity of the tokens stored in the slave element 107, when it determines that no valid token is available in the slave element 107. For this purpose, the slave application is preferably capable of determining the validity of the tokens stored in the slave element 107. Upon receipt of the notification the master application transmits a new valid token or set of valid tokens to the slave application. If the tokens are provided by the server 114, the master application may request the transmission of new valid tokens from the server 114. The token or tokens are being stored again in the slave element 107 and can be used for the execution of further transactions.

In one exemplary embodiment, a predetermined number of tokens may be provided automatically to the slave application in response to the notification. In another exemplary embodiment, the transmission of valid tokens to the slave application has to be confirmed by the user of the communication unit 101 by a corresponding operation of the mobile communication device 110. Moreover, one or more predefined conditions may have to be fulfilled in order that the master application provides a new token or set of tokens. These conditions may be preconfigured in the master application or they may again be specified by the user of the communication unit 101. According to one possible condition, the master application may not provide a new valid token or a new set of valid tokens unless a predetermined time interval has elapsed since the preceding transmission of one or more valid tokens to the slave application. This is especially useful, when the validity of tokens is limited to a certain time period. In this case, the time interval between two transmissions of valid tokens may correspond to the validity period of the tokens. The conditions may be checked by the master application. If the tokens are provided by the server 114 it is also possible that the server 114 checks whether the conditions are fulfilled when it receives the request for tokens sent by the master application.

Furthermore, it may be provided that a terminal 102 marks tokens as invalid during the execution of an interaction. Particularly, this may be done in connections with tokens that are valid only for a predetermined number of transactions. Here, the slave application may transmit the tokens marked as invalid to the master application, when requesting one or more new valid tokens. The master application does not provide new valid tokens to the slave application unless it has received and checked the token marked as invalid. When checking these tokens, the master application may determine whether all tokens provided to the slave application have been marked as invalid and may only provide new valid tokens if this check yields an affirmative result. Moreover, it may be necessary that the master application successfully verifies the authenticity of the markings. The authenticity of the marking of the invalid tokens may be checked using an authentication feature which is added to a marking by the terminal 102. For instance, the authentication feature may be a digital signature, which is verified by the master application using a digital certificate.

The aforementioned token-based embodiment may be applied in connection with ticketing applications providing tickets for public transportation, for example. Here, a plurality of tokens may be dispensed to the user, which represents the tickets for a certain time period, such as, for example, one year. Each token may be valid in a predetermined part of the time period, for example, in certain month, week or day of the respective year. Likewise, it is possible that each single token is valid for a predetermined number of transactions, i.e., for a predetermined number of trips with a public transportation system. In a similar way, the scenario can be applied to payment applications, for example. Here, a plurality of tokens may be dispensed to the user, which allow payment up to a predetermined total amount and/or which allow the execution of a predetermined total number of transactions. Each token may be valid for executing transactions involving a part of the total amount and/or for the execution of a number of transactions less than the total number. The master application may provide single tokens to a slave application contained in the slave element 107, which controls the transactions with terminals 102 validating the tokens. In both scenarios, the tokens may be made available to the slave application in such a way, that only a predetermined number of valid tokens is stored in the slave element 107 at one time. For instance, the master application may transmit valid tokens to the slave application one by one, where one token is made available after the validity of the preceding token has expired.

The use of tokens having limited validity particularly has the advantage that the compliance of the restrictions by the slave application does not have to be monitored, since the terminal 102 does not allow the execution of a transaction when the validity of the tokens available in the slave element 107 has expired. Particularly, the slave element 107 does not have to dispose of a security mechanism, which allows for monitoring the compliance with the restrictions.

In another exemplary embodiment, the ability of a slave application to execute transactions is restricted by constraints, which are provided by one or more applications included in the master element 108 and which are observed by one or more slave applications executed in the slave element 107. Particularly, a master application may provide constraints for the corresponding slave application or an application of the master element 108 may provide constraints for several predetermined slave applications. In this exemplary embodiment, the slave element 107 may dispose of a security mechanism, which prevents or makes it difficult that the constraints are being avoided. However, it may provide an advantage of this embodiment that the constraints can be defined within the communication unit 101 autonomously, while in the exemplary embodiment described before, the restrictions have to be made available to the terminals 102.

The constraints, which can be defined, correspond to the aforementioned limitations of the tokens. Thus, the respective application of the master element 108 may generate constraints, which allow one or more slave applications to execute only a predetermined number of transactions or to execute transactions only within a predetermined period of time. Likewise, a constraint may allow transactions until a predetermined amount of a quantity is reached, which has already been described before. Moreover, a constraint may allow the execution of transactions only with predetermined terminals 102, which may be terminals 102 in a predetermined geographical region, terminals 102 operated by predetermined operators or terminals 102 that are identified according to any other suitable criterion. The terminals 102 with which transactions can be executed may be defined using a white list or a black list, for example. The white list comprises terminals 102 with which transactions can be executed, while the black list identifies those terminals 102 with which transactions are not allowed to be executed. One slave application may be subject to one constraint or it may be subject to several constraints, for example, several of the aforementioned constraints.

The constraints may be preconfigured in a master application or another application provided in the master element 108. As an alternative or in addition, constraints may be defined by the user of the mobile communication device 110. For this purpose, the respective applications may provide a user interface at the mobile communication device 110, which allows the configuration of constraints by the user. In a further exemplary embodiment, constraints may be provided by the server 114 upon request using the OTA mechanism. In one exemplary embodiment, the slave element 107 and/or predetermined applications of the slave element are blocked if no constraint is provided by the master element 107. This prevents the slave applications to execute transactions in the absence of constraints.

The constraints are transmitted to the slave element 107 or to slave applications concerned upon their generation or each time the slave element 107 is newly connected to the master element 108, i.e., each time the add-on device 112 is connected to the mobile communication device 110 and/or each time the mobile communication device 110 or the add-on device 112 is powered up. When the constraints are received in the slave element 107, they are implemented in a security mechanism of the slave applications concerned. This means that the slave applications observe the constraints relating to the slave applications. For this purpose, a slave application checks whether the execution is allowed each time the communication component 103 connects to a terminal 102. If it is determined that the execution of a transaction is not allowed, the slave application refuses the transaction.

For checking, whether the execution of a transaction is allowed, a slave application may have access to a security infrastructure. For instance, if the constraint allows transactions to be executed only within a predetermined period of time, the slave application checks whether the actual time falls into the time period using a secured clock or time counter of the slave element 107. If the actual time does not fall into the period of time, the transaction is refused. If the constraint specifies a maximum number of transactions or a maximum amount of a quantity involved in certain transactions, the slave application uses a secured counter of the number of transactions or of the quantity to determine, whether the transaction is allowed. If the counter value exceeds the threshold specified in the constraint, the transaction is refused.

Furthermore, if the constraint specifies allowed or forbidden terminals 102 for a transaction, the slave application may analyze identification information sent from the terminal 102 and evaluates whether it is allowed to execute a transaction with the terminal 102. The transaction is refused, if it is not determined that it is allowed to execute the transaction with the terminal 102.

Certain constraints allow the execution of transactions within a limited time period. This group of constraints comprises constraints, which explicitly define a time period in which transaction can be executed, constraints, which specify a number of allowed transactions, and constraints, which specify a maximum usable amount of a predetermined quantity. When a slave application determines that this constraints become effective in such a way that transactions cannot be executed, i.e., when it is determined that the time period has lapsed, that the specified number of transactions has been executed or that the maximum amount of the quantity is reached, it may notify the application of the master element 108, which generated the constraint. Upon receipt of the notification the application may provide a new constraint and may transmit the new constraint to the slave element 107 or the slave applications concerned, so that further transactions can be executed.

Again, the new constraints may be provided automatically in response to the notification or they may be defined by the user of communication unit 101. As an alternative, the constraints may be provided by the server 114 upon a corresponding request. In addition, one or more predefined conditions may have to be fulfilled in order that a new constraint is provided. These conditions may again be preconfigured in the respective application for the server 114, or they may again be specified by the user of the communication unit 101. According to one possible condition, a new constraint is not provided unless a predetermined time interval has elapsed since the preceding transmission of a constraint. If the preceding constrained defined a period in time within which the execution of transactions is allowed, the time interval between two transmissions may correspond to time period specified in the constraint. The conditions may be checked by the respective application in the master element 108. If the tokens are provided by the server 114 it is also possible that the server 114, checks whether the conditions are fulfilled when it receives the request for a new constraint.

A further exemplary embodiment provides that the slave applications included in the slave element 107 can only be executed to perform transactions, after the slave element 107 has been authenticated by an unblocking application included in the master element 108. In order to achieve this, the slave element 107 may be unblocked by a secure mechanism upon an unblocking message sent from the unblocking application. Thereby, it is ensured that malicious add-on devices 112 are prevented from accessing the master applications in the master element 108.

In order to unblock the slave element 107, an application included in the slave element 107 may transmit an unblocking request to the master element 108 when the add-on device 112 is connected to the mobile communication device 110 and or when the add-on device 112 is powered up. The request includes an authentication feature allocated to the add-on device 112. Upon receipt of the request the unblocking application checks the authentication feature. If the check is successful, it sends the unblocking message to the application of the slave element 107, which unblocks the slave element 107 upon receipt of the unblocking message. If the check is not successful, no unblocking message is being sent, and the slave element 107 remains blocked.

In addition, or as an alternative to the transmission of the unblocking message, the application of the security element 108 may also install the slave applications in the slave element 108 and/or it may provide to the slave applications the information needed to execute transactions. Thus, the installation of the slave applications and/or the provision of the information needed to execute transactions depends on the successful authentication of the slave element 107.

The authentication feature may be a digital signature, which is encrypted using an encryption key allocated to the slave element 107. The digital signature may be verified by decrypting the digital signature using a decryption key. In one embodiment, symmetric encryption is applied, which means that the encryption key and the decryption key are identical. In another exemplary embodiment, asymmetric encryption is used, where the encryption key and the decryption key form part of an asymmetric key pair.

The encryption key may be preinstalled in the slave element 107, and the decryption key may be preinstalled in the master element 108. If one add-on device is used in connection with several mobile communication devices 110, the key may be preinstalled in the master element 108 of each mobile communication device. As an alternative each master element 108 and the slave element 107 share a different key or key pair, where the key or key pair allocated to a specific master element 108 is used to authenticate the slave element in this master element 108. When preinstalled keys are provided, a specific one add-on device 112 can only be used together with specific predetermined SIM cards 109. Likewise, it is possible that the user of the communication unit 101 installs the keys in the slave element 107 and in the master element 108.

As an alternative, the keys may be installed or generated in the master element 108 and the unblocking application provides the encryption key to the slave element 108. This may be done, for example, when the add-on device 112 is connected to the mobile communication device 110 for the first time. Before the encryption key is provided to the slave element 107, a secure pairing of the mobile communication device 110 and the add-on device 112 may be carried out. When one add-on device 112 is used together with more than one mobile communication device 110, the add-on device is paired with each mobile communication device 110 at least one time.

In one exemplary embodiment, the secure pairing is initiated in the master element 108 by generating a credential, which may be a code for example. Then, the credential is provided to the slave element 107. For this purpose, another transportation channel is used then the interface 113 connecting the add-on device 112 to the mobile communication device 110. The communication channel is chosen in such a way that is ensured that the credential is passed to the intended add-on device 112 preferably without being accessible by unauthorized parties or devices during the transport. For this purpose, the credential may be displayed at the mobile communication device 110 and the user of the communication unit 101 may input the credential into the add-on device 112 using an input unit of the add-on device 112. As an alternative, the credential may be stored in a memory device, such as a memory card, a USB flash device or the like, which is connected to the mobile communication device 110, at first. Then, the user disconnects the memory device from the mobile communication device 110 and connects it to the add-on device 112 so that the credential can be read by an application of the slave element 107.

After having passed the credential to the slave element 107 and after having connected the add-on device 112 to the mobile communication device 110 via the interface 113, the unblocking application of the master element 108 sends a request to provide the credential to the slave element 107. Upon receipt of the request, the credential is transmitted to the master element 108 via the interface 113. Then, the application of the master element 108 compares the received credential with the credential generated in the master element 108, which was stored in the master element 108 for this purpose. If the credentials match, the pairing is successful and the encryption key is provided to the slave element 107. In case the credentials differ from each other, the pairing is not successful and the encryption key is not provided to the slave element 107.

In an alternative embodiment, a successful secure pairing of the master element 108 and the slave element 107 replaces the verification of the digital signature. In this case, the pairing of the devices may be done each time the slave element 107 is newly connected to the master element 108, i.e., each time the add-on device 112 is connected to the mobile communication device 110 and/or each time the mobile communication device 110 or the add-on device 112 is powered up. Each pairing process may involve a new credential or one credential may be used in a predetermined number of pairing process. In the latter case, the credential is stored in the master element 108 and the slave element 107 as long it is valid so that it does not have to be transported to the add-on device 112 by the user. In the pairing process, the application of the slave element 107 transmits the stored credential to the master element 108 upon request. In the master element 108, the unblocking again compares the received credential with the credential generated in the master element 108, which was stored in the master element 108 for this purpose. If the credentials match, the pairing is successful. In case the credentials differ from each other, the pairing is not successful and the encryption key is not provided to the slave element 107. After a successful pairing, the unblocking message is sent to the slave element 107 and the slave element 107 is being unblocked. In addition or as an alternative to the transmission of the unblocking message, the slave applications may be installed in the slave element 108 and/or the information needed to execute transactions may be provided to the slave applications. In this exemplary embodiment, the credential corresponds to the authentication feature that is verified when checking the authenticity of the slave element.

While the invention has been illustrated and described in detail in the drawings and foregoing description, such illustration and description are to be considered illustrative or exemplary and not restrictive; the invention is not limited to the disclosed exemplary embodiments. Other variations to the disclosed exemplary embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

What is claimed is:

1. A device, comprising:
    a second device comprising a communication component for contactless short range communication with a terminal, and the second device further comprising a slave element execution environment adapted to execute at least one application being adapted to execute transactions between the communication component and the terminal via a first interface coupling the communication component and the slave element execution environment; and
    a first device comprising a secure master element, wherein the secure master element can be coupled to the slave element execution environment via a second interface, the secure master element providing information to the slave element execution environment, the information being used for executing the transaction, the secure master element being adapted to control the slave element execution environment, via the second interface, before the transaction is executed by means of the slave element execution environment, using the application via the second interface by means of a master application included in the secure master element enabling the master application to initiate execution of the transaction with the terminal by means of the execution environment and restricting the application to execute the transactions with the terminal to the execution environment, the information being deleted from the slave element execution environment when the first device and the second device are disconnected or when the first device or the second device is powered down.

2. The device recited in claim 1, wherein the first interface allows a faster data exchange than the second interface.

3. The device recited in claim 1, wherein the master element is adapted to provide the application to the slave element execution environment in response to a first event and/or to provide information to slave element execution environment in response the first event, the information being necessary for executing the transaction.

4. The device recited in claim 3, wherein the master element is adapted to unblock the slave element execution environment for the execution of a transaction in response to a second event.

5. The device recited in claim 3, wherein the master element is adapted to verify an authentication feature allocated to the slave element execution environment, the authentication feature being transmitted from the slave element execution environment to the master element, and wherein a successful verification of the authentication feature corresponds to the first and/or the second event.

6. The device recited in claim 1, wherein the master element is adapted to restrict an ability of the application to execute a transaction.

7. The device recited in claim 1, wherein the master element is adapted to provide at least one token to the application, the token being validated in the terminal before the transaction is executed.

8. The device recited in claim 7, wherein a validity of the token for the execution of transactions is limited.

9. The device recited in claim 1, wherein the master element is adapted to transmit at least one constraint to the slave element execution environment, the constraint restricting the ability of the application to execute transactions and being observed by the slave element execution environment and/or the application.

10. The device recited in claim 1 the second device being removably attachable to the first device.

11. The device recited in claim 10, wherein the first device is a mobile communication device.

12. The device recited in claim 1, wherein the master element is included in a smartcard connected to the first device.

13. The device recited in claim 12, wherein the smartcard comprises a SIM card.

14. The device recited in claim 1, wherein the communication component is configured according to an NFC specification and comprises a antenna and an NFC controller.

15. A method for contactless short range communication between a device and a terminal, the method comprising:
    coupling a slave element execution environment to a communication component for contactless short range communication via a first interface, the slave element execution environment being adapted to execute at least one application being adapted to execute transactions between the communication component and the terminal, via the first interface, wherein the slave element execution environment and the communication component are comprised by a second device; and
    coupling the slave element execution environment to a secure master element via a second interface, the secure master element providing information to the slave element execution environment, the information being used for executing the transaction, the secure master element being adapted to control the slave element execution environment before the transaction is executed by means of the slave element execution environment using the application, via the second interface, by means of a master application included in the secure master element enabling the application to initiate execution of the transaction with the terminal and restricting the application to execute the transactions with the terminal to the slave element execution environment; and deleting the information from the slave element execution environment when a first device comprising the secure master element and the second device comprising the slave element are disconnected or when the first device or the second device is powered down.

16. A device, comprising:

a second device comprising a communication component comprising an antenna for contactless short range communication with a terminal, and the second device further comprising a slave element execution environment adapted to execute at least one application being adapted to execute transactions between the communication component and the terminal, via a first interface, wherein the slave element execution environment is coupled to the communication component via the first interface and wherein the slave element execution environment can be coupled to a first device comprising a secure master element via a second interface, the secure master element providing information to the slave element execution environment, the information being used for executing the transaction, the secure master element being adapted to control the slave element execution environment before the transaction is executed by means of the slave element execution environment using the application by means of a master application included in the secure master element enabling the application to initiate execution of the transaction with the terminal by means of the slave element execution environment and restricting the application to execute the transactions with the terminal by means of the slave element execution environment, wherein the second interface allows powering of the second device by using an external radio frequency generated by the terminal, the second device being adapted to delete information from the slave element execution environment when the first device and the second device are disconnected or when the first device or the second device is powered down.

17. The device recited in claim 1, wherein the slave element execution environment is configured so that that the application is not able to execute a transaction without an interaction between the master element and the slave element execution environment preceding the transaction.

* * * * *